(12) United States Patent
Eckhard et al.

(10) Patent No.: US 11,003,794 B2
(45) Date of Patent: May 11, 2021

(54) REVERSIBLE ANONYMOUS TELEMETRY DATA COLLECTION

(71) Applicant: CA Software Österreich GmbH, Vienna (AT)

(72) Inventors: Benedikt Eckhard, Vienna (AT); Stefan Leitich, Vienna (AT)

(73) Assignee: CA Software Österreich GmbH, Vienna (AT)

( * ) Notice: Subject to any disclaimer, the term of this patent is extended or adjusted under 35 U.S.C. 154(b) by 291 days.

(21) Appl. No.: 16/159,188

(22) Filed: Oct. 12, 2018

(65) Prior Publication Data

US 2020/0117831 A1 Apr. 16, 2020

(51) Int. Cl.
*H04L 29/06* (2006.01)
*G06F 21/62* (2013.01)
*G06F 21/60* (2013.01)
*H04L 9/06* (2006.01)

(52) U.S. Cl.
CPC ........ *G06F 21/6254* (2013.01); *G06F 21/602* (2013.01); *H04L 9/0643* (2013.01); *H04L 63/0421* (2013.01); *H04L 2209/04* (2013.01); *H04L 2209/42* (2013.01)

(58) Field of Classification Search
CPC . G06F 21/6254; G06F 21/602; H04L 9/0643; H04L 63/0421; H04L 2209/04; H04L 2209/42
USPC ......................................................... 713/189
See application file for complete search history.

(56) References Cited

U.S. PATENT DOCUMENTS

| | | | |
|---|---|---|---|
| 8,463,752 B2 * | 6/2013 | Brinkmoeller | G06F 21/6254 707/662 |
| 8,607,305 B2 * | 12/2013 | Neystadt | G06F 21/44 726/1 |
| 9,794,373 B1 * | 10/2017 | Steinmetz | H04L 67/42 |
| 10,664,616 B2 * | 5/2020 | Herlocker | G06F 16/29 |
| 2011/0145593 A1 * | 6/2011 | Auradkar | H04L 9/006 713/189 |
| 2011/0283362 A1 * | 11/2011 | Horneff | H04H 20/38 726/26 |
| 2012/0259877 A1 * | 10/2012 | Raghunathan | G06F 21/6254 707/757 |
| 2018/0268168 A1 * | 9/2018 | Herlocker | G06F 16/29 |
| 2019/0347344 A1 * | 11/2019 | Kessler | G06F 21/6254 |

* cited by examiner

*Primary Examiner* — Michael S McNally
(74) *Attorney, Agent, or Firm* — Morgan, Lewis & Bockius LLP

(57) ABSTRACT

According to one aspect of the present disclosure, a telemetry data set, which includes a plurality of data fields associated with application operations, is collected for an application. A request for at least a portion of the telemetry data set is received and processed. Data fields in the telemetry data set that are to be anonymized are identified based on the request, with information in the identified data fields is to be anonymized according to corresponding anonymization rules. The information in each of the identified data fields is masked based on the corresponding anonymization rule for the data field, and an anonymized telemetry data set is generated. The anonymized telemetry data set includes the masked information for the identified data fields and unmasked information for other data fields indicated in the request.

19 Claims, 7 Drawing Sheets

```
{"namespace" : "analytics.telemetry.schema",
 "type" : "record",
 "name" : "SnapshotV1",
 "fields: [
    {"name" : "name", "type" : "string", "anonymize" : ["rules" : ["maskALLHash"]]},
    {"name" : "version", "type" : "string"},
    {"name" : "platform", "type" : "string"},
    {"name" : "hardware", "type" : "string"},
    {"name" : "software", "type" : "string"},
    {"name" : "software_version", "type" : "string"},
    {"name" : "ip", "type" : "string", "anonymize" : ["rules" : ["ruleSetIP"]]},
    {"name" : "activate", "type" : "boolean"},
    {"name" : "port", "type" : "int"},
    {"name" : "ae_id", "type" : "string"}
 ]
}
```

FIG. 4A

452 → # rules maskIp
anonymizer.rules[maskIp] .desc=Match and encrypt an IPv4 address
anonymizer.rules [maskIp] .action=IP_CRYPT 454 → # rules maskIp6
anonymizer.rules[maskIp6] .desc=Match and encrypt an IPv6 address
anonymizer.rules[maskIp6] . action=IP6_CRYPT 456 → # rule maskAllHash
anonymizer.rules[maskAllHash] .desc=Replaces the complete string with a Hash
anonymizer.rules[maskAllHash] .pattern= ( .* )
anonymizer.rules[maskAllHash] . action=REGEX_REPLACE
anonymizer.rules[maskAllHash] .params [0] =<sha-256>

458 → # rule maskWordHash
anonymizer.rules[maskWordHash] .desc=Replaces all words with their respective Hash
anonymizer.rules[maskWordHash] .pattern= (\\w+)
anonymizer.rules[maskWordHash] .action=REGEX_REPLACE
anonymizer.rules[maskWordHash] .params[0]=<sha-256>

460 → # rule maskWPCP
anonymizer.rules[maskWPCP] .desc=Remove site info for WP and CP
anonymizer.rules[maskWPCP] .pattern= {.*[#] ) [W|C]P.*
anonymizer.rules[maskWPCP] .action=REGEX_REPLACE
anonymizer. rules [maskWPCP] .params [0] =

462 → # rule debug
anonymizer.rules[debug] .desc=Transformation for debugging purpose
anonymizer.rules[debug] .pattern- ( .* )
anonymizer.rules[debug] .action=REGEX_REPLACE
anonymizer.rules[debug] .params[0]=<dbg>

464 → # Rule sets, lists of rules
anonymizer.rulesets[ruleSetIP]=maskIp, maskIp6

FIG. 4B

REVERSIBLE ANONYMOUS TELEMETRY DATA COLLECTION

BACKGROUND

The present disclosure relates in general to the field of computing systems, and more specifically, to telemetry data collection in computing systems.

Modern software systems often collect telemetry data that gives insight into the operations and functioning of an application. However, in some cases, the telemetry data may include certain information that an owner of the software system might not want to be seen by third parties, such as support personnel, consultants, or other third parties that might have access to the telemetry data. For example, some software system owners might not wish for network information (e.g., IP address information), machine information (e.g., MAC address or hostname information), or user information (e.g., name or email address) to be seen by third parties accessing the telemetry data.

BRIEF SUMMARY

According to one aspect of the present disclosure, a telemetry data set, which includes a plurality of data fields associated with application operations, is collected for an application. A request for at least a portion of the telemetry data set is received and processed. Data fields in the telemetry data set that are to be anonymized are identified based on the request, with information in the identified data fields is to be anonymized according to corresponding anonymization rules. The information in each of the identified data fields is masked based on the corresponding anonymization rule for the data field, and an anonymized telemetry data set is generated. The anonymized telemetry data set includes the masked information for the identified data fields and unmasked information for other data fields indicated in the request.

According to another aspect of the present disclosure, a schema for gathering telemetry data collected for an application is accessed. The schema indicates a plurality of data fields of the telemetry data to gather, with at least one data field in the schema having a corresponding anonymization rule to anonymize information in the data field. Telemetry data is gathered according to the schema, which includes masking the information for each of the one or more data fields having a corresponding anonymization rule in the schema. The masking is based on a masking action indicated in the anonymization rule. An anonymized telemetry data set, which includes unmasked information for each of the data fields indicated in the schema without a corresponding anonymization rule and the masked information for each of the data fields indicated in the schema having a corresponding anonymization rule, is generated.

BRIEF DESCRIPTION OF THE DRAWINGS

FIG. 4A is an example schema for collecting anonymized telemetry data in accordance with at least one embodiment;

FIG. 4B is an example set of anonymization rules for anonymization of information in one or more data fields of a telemetry data set in accordance with at least one embodiment.

Like reference numbers and designations in the various drawings indicate like elements.

DETAILED DESCRIPTION

Figure 1:
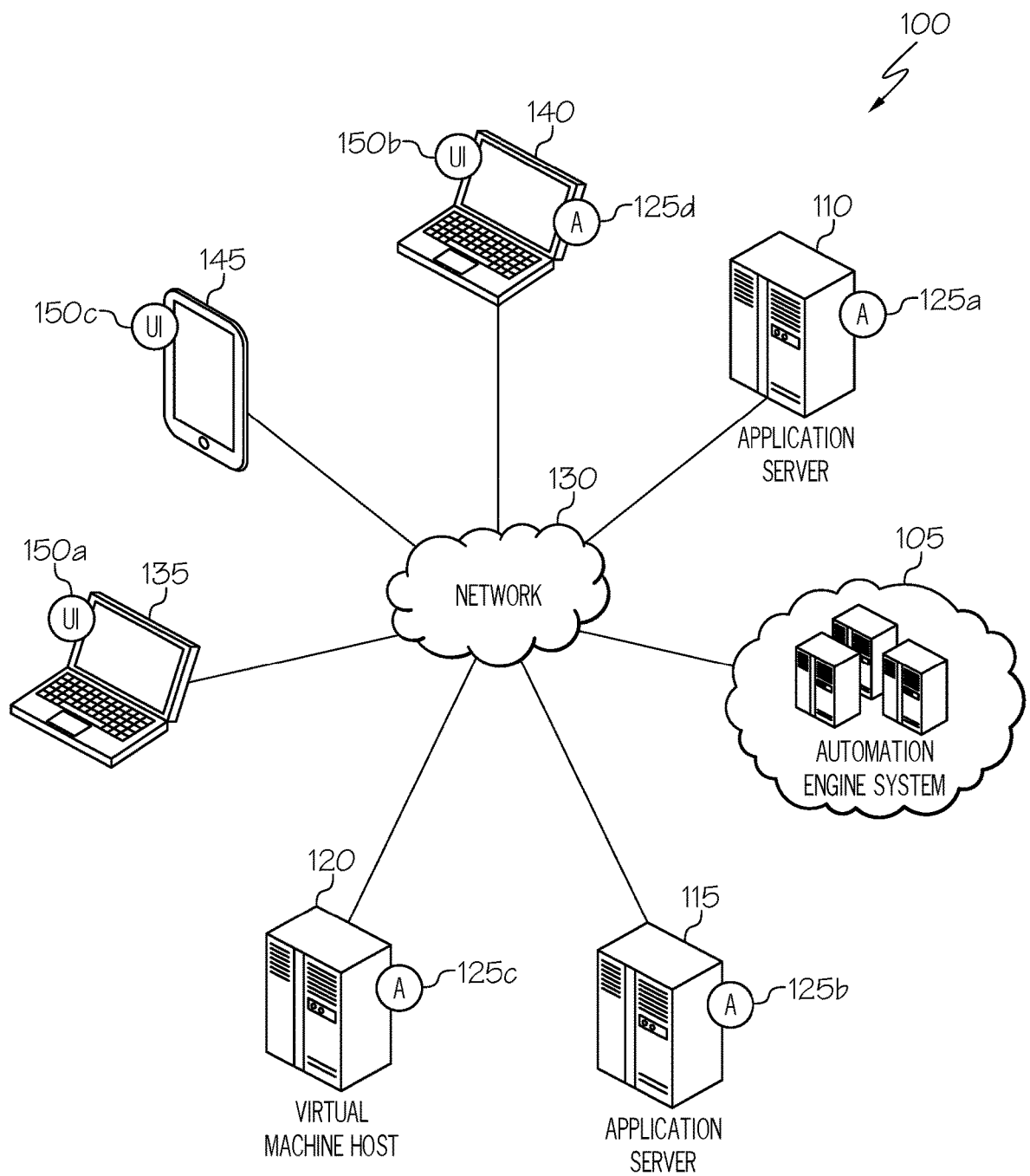
FIG. 1 is a simplified schematic diagram of an example computing system including an example deployment automation system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including an example automation engine system 105. The automation engine system 105 may be implemented on one or multiple host server devices and may flexibly implement a variety of software automation solutions and applications including release automation, workload automation, and automated service orchestration. An automation engine system may implement an automation engine implemented through a collection of interconnected work processes (hosted on one or more of the servers of the automation engine system 105) and communication processes (hosted on one or more the servers of the automation engine system 105). The work processes may be configurable to perform tasks to automate a variety of tasks on a computing system local to or remote from the automation engine system 105. For instance, an automation engine hosted on automation engine system 105 may automate workflows utilizing software applications, scripts, applets, or other software programs hosted on one or multiple different target computing systems, such as application server systems (e.g., 110, 115). In other instances, the automation engine may be utilized to orchestrate a service or automate the deployment and installation of a new software release on one or more of these systems (e.g., 110, 115) or other computing systems (e.g., a virtual machine or container-based host system (e.g., 120)), among other examples. Hosts and server systems may also be implemented on personal computing devices (e.g., 140), Internet of Things (IoT) devices, smart home systems, media consoles, smart appliances, and other computing systems, which may interface with an automation engine (on automation engine system 105) over one or more networks (e.g., 130) in connection with workflow automation, release automation, service orchestration, or other software automation applications supported by the automation engine.

In some implementations, agents (e.g., 125$a$-$d$) may be provisioned on host systems (e.g., 110, 115, 120, 140) to provide a hook for the automation engine to control operating system tasks or other operations and functionality provided on a host system through an operating system, hypervisor, application, or other software program, which may facilitate a workflow automation, release automation, service orchestration, or other software automation implementation. An automation engine may communicate with various agents deployed within host systems (e.g., 110, 115, 120, 140), for instance, through communication processes implementing the automation engine. In some implementations, communication processes may support and implement network communications (e.g., over one or more networks (e.g., 130)) between the computing system(s) (e.g., 105) hosting the work processes and other components of the automation engine. Further, in some implementations, user interfaces (e.g., 150$a$-$c$) may be defined in connection with the automation engine, which may be accessed on one or more user computing devices (e.g., 135, 140, 145), for instance, as a web-based or browser-implemented user interface. Users may provide inputs and define parameters for an automation implemented by the automation engine through these UIs (e.g., 150$a$-$c$). The inputs may be routed to one or more of the work processes of the automation engine using the communication processes of the automation engine, to allow for the definition of user-customized automations and even the definition of new or customized automations provided through the automation engine, among other examples.

In general, "servers," "clients," "computing devices," "network elements," "database systems," "user devices," and "systems," etc. (e.g., 105, 110, 115, 120, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, zOS, etc., as well as virtual machines and emulators adapted to virtualize execution of a particular operating system, as well as container-based operating environments (e.g., Docker containers, Kubernetes containers, etc.), and customized and proprietary operating systems among other examples.

Further, servers, clients, network elements, systems, and computing devices (e.g., 105, 110, 115, 120, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, an automation engine system 105, application server (e.g., 110, 115), host server 120, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Through the advent of cloud and distributed computing architectures, together with agile software development paradigms, the management and implementation of software systems by enterprises has become increasingly complex. For instance, as computing systems migrate to cloud or hybrid cloud environments, managing workflows and deployment of new software may be more complex and costly without information technology automation. Further, given the rapid pace of software innovation, versioning, and updates, the pace at which software is released and orchestrated has likewise increased. For instance, in the case of release automation, releases and updates may be frequent, complex, and expensive to deploy in modern software systems. Managing the potentially thousands of software releases, even relating to a single entity's (e.g., enterprise's) system, can be difficult and exact costs on the very operability of the system. Such releases include both releases of new software systems as well as updates or patches to existing software. Valuable information technology (IT) personnel and resources are dedicated within some enterprises to developing and carrying-out these deployments. Traditionally, human users are employed throughout the process of the deployment. Further, human IT resources are not only expensive, but error prone, resulting in some deployments which are incorrect and that may need to be re-deployed, further consuming time and personnel resources. Additionally, some systems may be sensitive to down periods that may be required in order to allow deployment of new software releases on the system, among other complexities, costs, and variables. Similar complexities and costs are introduced when considering the orchestration of new services, managing workflows in transactions to be handled and developed using a software system, among other example considerations.

Automation tools and processes may be purpose built to handle common automation tasks, however, given the diversity and continuing evolution of enterprises' software systems, specialized, purpose-built automation tools are often ill-equipped to adapt to the ever-changing landscape of modern software products and systems. In some implementations, a flexible, scalable, and configurable automation engine may be provided, which is capable of being used, reused, and repurposed, dynamically, to provide a single automation platform capable of handling and be extended to handle a wide and diverse array of automation workloads and tasks. At least some of the systems described in the present disclosure, such as the systems of FIGS. 1 and 2, can include functionality providing at least some of the above-described features that, in some cases, at least partially address at least some of the above-discussed issues, as well as others not explicitly described.

Figure 2:
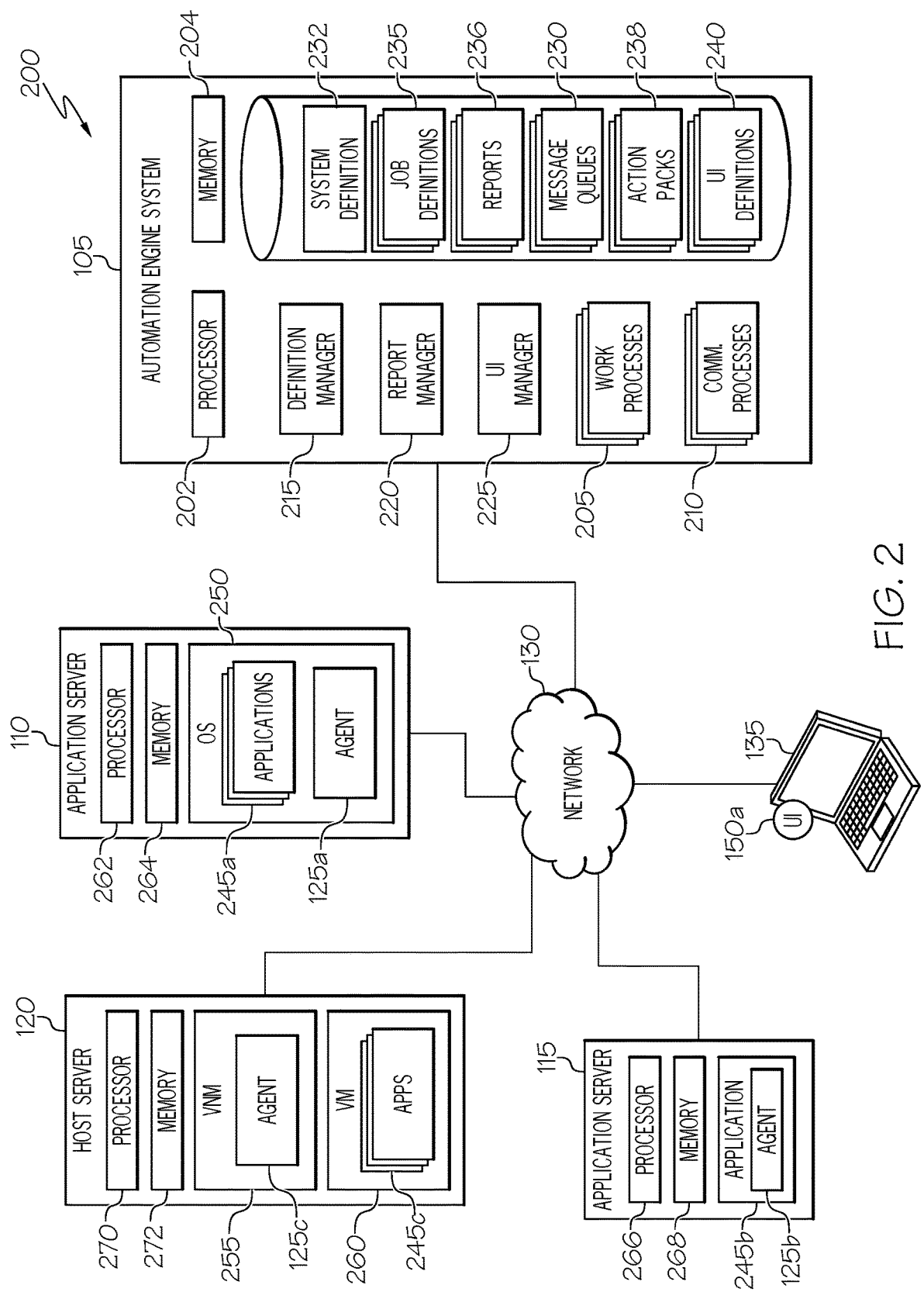
FIG. 2 is a simplified block diagram of an example computing system including an example deployment automation engine in accordance with at least one embodiment.

For instance, in the example of FIG. 2, a simplified block diagram 200 is shown illustrating an example environment including an example implementation of an automation engine system 105. An automation engine implemented using the automation engine system 105 may be composed of a collection of work processes 205 and communication processes 210. Work processes (e.g., 205) are server processes implemented within the automation engine to perform the actual server work in various automations, such as activating, generating, and executing tasks within a given automation job, together with monitoring the status of the tasks and collecting information (and generating report data) relating to the completion of these tasks. Work processes 205 may retrieve tasks from a queue, with the tasks including logic executable by the work process to cause the work process to perform a particular type of task. When the work process 205 accesses a next task from the queue, it may retrieve corresponding logic and perform the next task, which may be the same or a different type of task than the work process's previously performed task. Indeed, the flexibility of the work processes allow a configurable mix of tasks and corresponding jobs to be handled by the collection of the work processes 205 in the automation engine, allowing the automation engine to respond dynamically to what may be a changing and diverse workload the automation engine is called on to handle. In other instances, work processes may be configured to be dedicated to handling particular types of high priority or low latency tasks, such that all of the work process's bandwidth is directed toward these types of tasks in the automation engine's workload (e.g., despite the work process being otherwise operable to handle potentially any one of the variety of tasks in jobs handled by the automation engine).

Further, one of the work processes implemented in the automation engine may be designated as the "primary" work process. A primary work process, in some examples, may be designated at the launch of the automation engine (e.g., based on the work process being the first to start) and this primary work process may be assigned special tasks based on its designation as the primary process, such as central work process tasks. In some cases, the primary work process may be tasked with autonomously assigning roles to additional work processes as they are started within the automation engine. In some implementations, work processes may be assigned roles to filter the types of tasks the respective work process is to handle. For instance, some work processes may be assigned (e.g., by the primary work process) to perform an output server role to handle outputs such as storing log messages and reports generated in the automation engine within a database of the automation engine. Another example server role which may be assigned to work processes may be a resource calculation role to perform tasks such as calculating calendar objects, perform deadlock avoidance, and other tasks, which involve calculations, among other examples. In some implementations, separate queues may be maintained in the automation engine database for each server role, such that tasks of a given work process are extracted from the specific queue corresponding to the work process's assigned role, among other example features and implementations.

Communication processes (e.g., 210) are additional server processes running on one or more computing systems (e.g., 105) implementing an instance of an automation engine. Communication processes 210 may handle communication between agents (e.g., 125a-c)), user interfaces (e.g., 150a), and work processes (e.g., 205) in connection with the automation engine. Communication processes hold the connections to the agents and the user interfaces. In some implementations, all communication between agents and UIs may be exclusively performed through the communication processes 210. In some implementations, port numbers of the systems hosting the automation engine may be assigned to respective work processes and communication processes. All of the server processes (e.g., work processes 205 and communication processes 210) may communicate with each other. Such an architecture can ensure flexibility and fault tolerance, allowing remaining processes to assume the queued tasks of another process in the event the other process fails, among other example features and advantages.

As noted above, a communication process can connect with agents (e.g., 125a-c) and UIs (e.g., 150a) to facilitate the communication between the agents and UIs and various work processes (e.g., 205) of an automation engine implementation. Agents may be implemented on target systems (e.g., 110, 115, 120) to expose functionality of an operating system (e.g., 250), application (e.g., 245b), virtual machine manager (e.g., 255), or other software program to the automation engine. Accordingly, agents may be implemented according to the specific features of the target software component (e.g., 245b, 250, 255, etc.). As an example, different agents may be provided for instrumentation on any one of a variety of different operating systems, such as agents specific to Windows, Linux, iOS, zOS, etc., among other examples. In some implementations, agents may initiate connections with one of the communication processes provided in an automation engine. For instance, an agent may open a TCP/IP connection with one of the communication processes of the automation engine. In some implementations, each agent may connect to a single one of the communication processes, while each communication process may be connected to multiple agents and/or user interfaces. Communications between the agent and a communication process may be encrypted.

As discussed in the examples above, a collection of work and communication processes may be provided in an automation engine system. In some cases, it may be advantageous to host the work processes 205 and communication processes 210 on multiple nodes or computing devices, as this can enhance fault tolerance of the automation engine and boost efficiency and reliability through the distribution of these processes over several computers. In some implementations, a potentially unlimited number and variety of work and communication processes may be implemented in a single automation engine instance. Further, by adding processes it is possible to adjust to growing use of the automation engine system. For instance, should a heavy workload exist or be introduced due to the number of logged-on agents and/or UIs, the number of communication processes can be increased. Likewise, should the number of automation engine system tasks become too burdensome, the number of work processes can be increased, among other example advantages.

As further illustrated in FIG. 2, an example automation engine system 105 may include one or more data processing apparatus (e.g., 202), one or more computer memory elements 204, and other components and logic, implemented in hardware circuitry and/or software to implement an automation engine instance. For instance, a definition manager 215 may be provided, through which a system definition file 232 may be accessed, modified, and/or defined. A system definition 232 may define the number of work processes 205 and communication processes 210 within an automation engine instance, as well as detail the individual computing systems hosting these server processes, the ports assigned to each process, among other information utilized to define an automation engine instance. A definition manager 215 may additionally access and/or define job definitions, which may correspond to automation jobs that may be performed by the automation engine. The job definitions 235 may additionally detail the combination of automation tasks and the target systems involved in the performance of these tasks in the furtherance of such automation jobs. Automation jobs may provide the information to be loaded into work queues consumed by work processes 205 in the automation engine. In some cases, automation jobs may be packaged in action packs (e.g., 238), which may be pre-generated packages of common types of automations, which may be reused and redeployed in various customers' respective automation engine instances. An individual instance of an automation engine may allow a user or manager to parameterize the action pack to enable the action pack's use within a particular customer's system (with its component target systems) (e.g., using definition manager 215). In some implementations, a report manager 220 may also be provided, which may enable user access to reports 236 and other data generated through the execution of various automation jobs by the automation engine (e.g., as generated by work processes 205 within the automation engine). A UI manager 225 may also be provided, in some implementations, to allow users or managers to define new UIs or parameterize UI templates for use in providing UIs (e.g., 150a) that are to interface with and be used in connection with automation jobs performed by an automation engine deployment. UI definitions 240 may be generated and maintained by the automation engine system 105 to form the basis of these UIs (e.g., which may be presented through web- or browser-based interfaces on potentially any user endpoint device (e.g., 135) capable of connecting to the automation engine over a private or public network (e.g., 130)).

In some implementations, communication between server processes of an automation engine (e.g., its component work processes 205 and communication processes 210)) may be facilitated through message queues 230. Message queues (as well as other data used to implement an automation engine instance (e.g., 232, 235, 236, 240, etc.)) may be hosted in a database implemented in connection with the automation engine and hosted on one of the computing systems of automation engine system 105. Message queues (e.g., 230) may be implemented as database tables, through which a work or communication process may post a message that may then be read and processed by another work or communication process, thereby facilitating communication between the processes. Additional queues may also be provided which contain the tasks that are to be accessed by server processes and performed in connection with an automation engine implementation. In some implementations, an automation engine instance may have multiple message queues. Depending on their types, tasks are lined up in the corresponding queue. If a work process is momentarily idle or finished with its current tasks, it will take the next queued task and process it. The execution of the task can lead to a new task for the work queue to be then attached to the current tasks. Some tasks may be dedicated tasks, which are allowed to only be processed by the primary work process. Accordingly, in such implementations, a primary work process, upon completing a preceding task, may first check (in a corresponding queue) whether any special work tasks are waiting in the queue before turning to more general work queues for generally work tasks shared with the other work processes, or this reason, the "freed-up" primary work process always checks first if any of these special work processes are present in the queue. Communication processes may utilize communication queues for communication tasks to be performed by communication processes to collect or send data from/to agents and/or UIs associated with the automation engine. In some instances, if a work process tasks involves the passing of information to agents or UIs, the work process may, as part of the performance of its task, write a new communication queue to the respective communication queue in order to prompt the communication process's involvement in the passing of this information, among other examples.

As noted above, an automation engine provided through an automation engine system 105 may be used to automate activities on various target systems (e.g., 110, 115, 120). For instance, application servers (e.g., 110, 115) hosting various applications and other software tools and programs (e.g., 245*a*-*b*) may be target systems of an automation engine. For instance, tasks automated by an automation engine may automate deployment of a new or updated version of an application or system of interoperating programs on one or more computing systems (e.g., 110, 115, 120). In other examples, a workflow involving one or more multiple different cooperating applications (e.g., 245*a*-*c*) may be automated may be automated using an automation engine, among other examples. The automation engine may interface with agents to cause functionality present on the target system to be triggered and automated according to defined automation engine tasks and jobs. In some instances, agents (e.g., 125*a*) may be present on an operating system (e.g., 250) of the host system (e.g., 110), on which a target application (e.g., 245*a*) runs. In other instances, the agent (e.g., 125*b*) may be present on the application (e.g., 245*b*) itself. During the automation of a workflow, the automation engine may communicate with and cause actions to be performed on multiple different applications (e.g., 245*a*-*c*) and host systems (e.g., 110, 115, 120) through corresponding agents (e.g., 125*a*-*c*). In automation jobs involving service orchestration or release automation, agents (e.g., 125*a*, *c*) may be used to access functionality and resources of the system that are used to deploy, install, configure, load, or otherwise automate deployment or installation of a program on one or more target systems. As an example, an application may be automatically deployed on a virtual machine using an example automation engine, through the automation engine's communication with an agent (e.g., 125*c*) provided on a virtual machine manager (VMM) or hypervisor (e.g., 255) that is to automatically build the host virtual machine (e.g., 260) upon which the application (e.g., 245*c*) is to be installed and run at the direction of the automation engine, among other examples.

Figure 3:
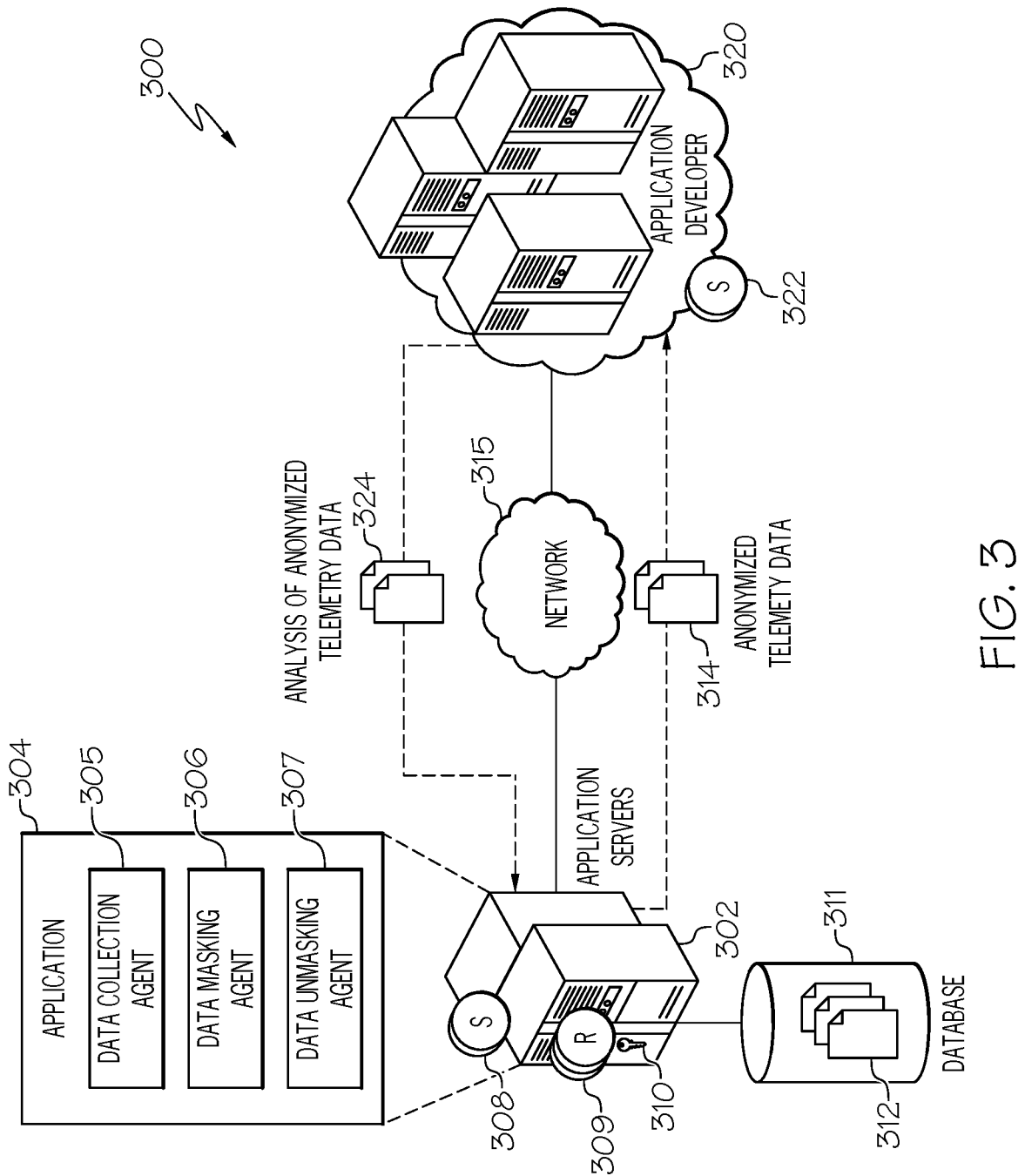
FIG. 3 is a simplified schematic diagram of an example computing system for generating anonymized telemetry data in accordance with at least one embodiment.

FIG. 3 is a simplified schematic diagram of an example computing system 300 for generating anonymized telemetry data in accordance with at least one embodiment. The computing system 300 includes one or more application servers 302 and an application developer 320, which may be implemented similar to the application server 115 and AES 105 of FIG. 1, respectively. The application servers 302 and application developer 320 are communicably coupled to one another via the network 315, which may include any suitable type of network (e.g., like network 130 of FIG. 1). In the example shown, the application servers 302 run a software application 304, which may perform one or more operations on the application servers 302. However, in other implementations, the application 304 may run on one or more virtual machine hosts (e.g., similar to virtual machine host 120 of FIG. 1) or another type of machine (e.g., similar to personal computing device 140 of FIG. 1).

In one or more implementations, telemetry data may be collected for operations performed by application 304. The telemetry data may include information about certain operations performed by the application 304 as well as other information relating to the application 304. For example, the telemetry data may identify information about the specific application server on which the application 304 runs (e.g., hostname, internet protocol (IP) address, media access control (MAC) address, etc.), information about a user of the application 304 (e.g., a name, email address, or other identifying information about the user), information about the specific application instance (e.g., in an environment with multiple application instances), or other information about the application 304 or operations performed by the application 304. The telemetry data that is collected may be analyzed by a provider of the application, such as the application developer 320, or by another party, such as, for example, to analyze runtime performance of the application or to identify or troubleshoot issues seen in the performance of the application.

In some instances, it may be desirable to anonymize certain aspects of the telemetry data collected before sending the telemetry data to a third party (e.g., an application provider, such as application developer 320) for analysis. For example, an owner or manager of the application servers 302 or the application 304 may wish to anonymize certain personally-identifiable information that is collected in the telemetry data, such as names or email addresses, or may wish to anonymize certain other information, such as hostname or machine address (IP, MAC) information, or other information that might not be necessary for performing the analysis. In some cases, the owner may simply wish to anonymize the data before storing the data, for security reasons.

Accordingly, in certain aspects of the present disclosure, portions of collected telemetry data may be anonymized before storing the data, before sending the data for analysis by a third party, or for another reason. The anonymization of the telemetry data may be reversible, non-reversible, or a combination thereof. For example, some information/data fields in the telemetry data may be anonymized or "masked"

in a reversible manner, while other information/data fields in the telemetry data may be anonymized or masked in a non-reversible manner. Reversible anonymization/masking may refer to the ability to "unmask" the information at a later time. For example, if certain information in the telemetry data is encrypted (e.g., using a symmetric key technique, such as Advanced Encryption Standard (AES) techniques), it may be decrypted at a later time using the encryption key(s) (e.g., private key 310) used to encrypt the information. Non-reversible anonymization/masking may refer to the inability to unmask the information at a later time. For example, if certain information in the telemetry data is hashed (e.g., using a Secure Hash Algorithm (SHA) or other hashing technique), it may not be recoverable due to the one-way hash function used to hash the information.

The information or data fields in the telemetry that is to be anonymized may be defined by a schema (e.g., 308) in some instances. The schema may define a number of fields that are to be collected for the telemetry data or gathered from an existing set of telemetry data, and may indicate which of those fields is to be anonymized. The schema may also indicate how each field is to be anonymized. For example, the schema may refer to one or more anonymization rules (e.g., 309) that define how the anonymization of a particular data field is to be performed. In some implementations, the schema may be implemented similar to the schema 400 of FIG. 4A and the anonymization rules may be implemented similar to the anonymization rules 450 of FIG. 4B, as described further below.

In the example shown in FIG. 3, the application 304 includes a data collection agent 305, a data masking agent 306, and a data unmasking agent 307. Each of the agents 305-307 may be implemented in hardware, software, firmware, or a combination thereof, and may be executable by data processing apparatuses of the application servers 302 to perform the functions described below. The data collection agent 305 initiates and handles collection of telemetry data for the application 304 and stores collected telemetry data sets 312 in a database 311 coupled to the application servers 302. The data collection agent 305 may collect the telemetry data based on a schema (e.g., 308) that indicates one or more data fields to collect. In some cases, a data collection schema 308 (e.g., one that indicates fields to be anonymized and indicates corresponding anonymization rules for those fields) may be defined on the application server 302 and may be replicated and stored with the application developer 320 (e.g., 322) for later use by the application developer 320.

The data masking agent 306 handles the anonymization of the telemetry data 312 and generates an anonymized telemetry data set 314 that may be sent to a third party (e.g., application developer 320) for analysis as described above, or may be stored in the database 311 alongside the non-anonymized telemetry data set(s) 312. In some embodiments, the data masking agent 306 may mask data fields in the telemetry data based upon one or more anonymization rules (e.g., 309) referenced by a schema (e.g., 308). The data masking agent 306 may anonymize the telemetry data and generate the anonymized telemetry data set in parallel with the collection of the data, or may do so at some time after the telemetry data has been collected.

The data unmasking agent 307 handles de-anonymization of telemetry data, when appropriate. For instance, in the example shown, the application servers 302 may receive an analysis or other information (e.g., 324) about the anonymized telemetry data set 314 sent to the application developer 320 that references certain masked data fields in the anonymized data set 314. The data unmasking agent 307 may accordingly unmask the data fields (e.g., using a private key 310). As an example, the application developer 320 may identify certain issues in the performance of the application 304 on the application servers 302 and identify a masked (e.g., encrypted) IP address of the application server, and the data unmasking agent 307 may unmask (e.g., decrypt) the masked IP address to identify which of the application servers 302 was referenced by the analysis 324.

FIG. 4A is an example schema 400 for collecting anonymized telemetry data in accordance with at least one embodiment. The schema 400 may be managed by an owner of an application, which may allow the owner to define which data fields are to be collected in the telemetry data and which fields are to be anonymized. In the example shown, the schema 400 is formatted according to an Apache Avro™ schema format, and includes a "namespace", a "type", a "name", and "field" entries as defined by the Avro™ schema format.

The "field" entries 402 in the example schema 400 define which telemetry data fields are to be collected, and may indicate which of the data fields are to be anonymized. The anonymization indication may be made by including a reference to an anonymization rule in the field entry. For instance, in the example schema 400, the field entries 404, 408 indicate that name information (the "name" field) and IP address information (the "ip" field), respectively, in the telemetry data are to be anonymized according to anonymization rules entitled "maskAllHash" and "ruleSetIP", respectively (which are described below with respect to FIG. 4B. In contrast, the field entry 406 for hardware platform information (the "platform" field) does not reference an anonymization rule, and therefore the hardware platform information collected will not be anonymized. Other field entries 402 in the schema 400 indicate that an application version (the "version" field), software name (the "software" field), software version (the "software_version" field), an indication of whether an instance of the application component is currently running (the "activate" field), a port (e.g., internet protocol (IP) port) used to connect to the application component (the "port" field), and an internal identifier for the application component (the "ae_id" field). Other types of information may be collected in the telemetry data as well, and other fields than 404, 408 may have corresponding anonymization rules referenced. The schema 400 may be formatted in another manner than that shown in FIG. 4A.

FIG. 4B is an example set of anonymization rules 450 for anonymization of information in one or more data fields of a telemetry data set in accordance with at least one embodiment. The anonymization rules 450 define how a particular data field is to be anonymized. For instance, as shown in FIG. 4A, a telemetry data collection schema may reference a particular anonymization rule for a particular data field, and the anonymization rule may be used in masking the information for that particular data field when collected. In the example shown, the anonymization rules are formatted according to the following:

anonymizer.rules[<rule name>].<property>=<value> where "anonymizer.rules" indicates a configuration prefix, "<rule name>" indicates a name of the rule, "<property>" indicates a particular property of the rule, and "<value>" indicates a value for the property. Some example properties that may be used in anonymization rules include: "desc" (a text description of the rule behavior); "pattern" (an expression of a pattern of text that is to be anonymized); "action" (the action to be taken to anonymize the information for the data field); and "params[0-n]" (an array of parameters whose values are based on the selected action, with a first parameter being noted as "params[0]", a second parameter being noted as "params[1]" and so on). In some implementations, the "desc" field may be optional for anonymization rule definitions, while the "pattern" and "action" fields may be mandatory for anonymization rule definitions. In some cases, certain actions may not require the "pattern" field in the anonymization rule definition (e.g., the IP_CRYPT and IP6_CRYPT actions described below), as such actions may have a pre-defined pattern associated therewith (e.g., an IP address pattern for those actions).

Some example actions that may be indicated by the "action" field include "IP_CRYPT", "IP6_CRYPT", "REGEX_REPLACE", and "FIXED". The "IP_CRYPT" and "IP6_CRYPT" actions may identify IPv4 or IPv6 addresses, respectively, and may replace the identified IP address information with an encrypted version of the IP address information (e.g., a hexadecimal string). For example, the telemetry data "My IP is: 192.168.0.1" will be masked by the IP_CRYPT action to show "My IP is: 3bd26b9b99ade3263d536155207e186c". As another example, the telemetry data "My IP is: 726:26:abcd:2000: 1000:4689:123:555" will be masked by the IP6_CRYPT action to show "My IP is: 40e41f97dc626d4573173a7e636f538d3cfa713e6e05a22a27 6cdf314dc1689d". By encrypting IP address information, certain significant information in the IP address (e.g., private IP addresses, subnet configurations, etc.) may be masked from view by a third party. The example rules 452, 454 of FIG. 4B illustrate an example usage of this action in the context of an anonymization rule.

The "FIXED" action may replace the information in a telemetry data field (e.g., based on the indication in the "pattern" field of the anonymization rule) with a fixed string (e.g., based on a parameter in the "params[ ]" field of the anonymization rule). The "REGEX_REPLACE" action may replace certain identified strings or substrings in a telemetry data field (e.g., based on the indication in the "pattern" field of the anonymization rule) with fixed strings (e.g., based on one or more parameters in the "params[ ]" field of the anonymization rule).

An example usage of the REGEX_REPLACE action is shown below:

```
...pattern = (domain)\\.(com)
...action = REGEX_REPLACE
...param[0] = company
...param[1] = site
```

In this example, two capturing groups "(domain)" and "(com)" are called out in the pattern field. The first capturing group is replaced with the first parameter "domain" and the second group is replaced by "site". Thus, an example input text of: "my computer hostname is PC120183.domain.com" would be masked to shown: "my computer hostname is PC120183.company.site". The example rule 466 of FIG. 4B illustrates an example usage of this action in the context of an anonymization rule, using a blank parameter field.

In some cases, the params[0-n] field can indicate certain transformation functions to be performed, such as, for example, encryption (e.g., using an <aes> tag to indicate that AES encryption is to be performed on a substring) or hash functions (e.g., using a<sha-256> tag to indicate that a substring is to be hashed according to the SHA-256 hash function). An example usage of the REGEX_REPLACE action illustrating this is shown below:

```
...pattern = ([a-z0-9]+)\\@domain.com
...action = REGEX_REPLACE
...params[0] = <aes>
```

In this example, we have one capturing group (an alphanumeric substring) which is to be replaced by an AES encrypted version of the substring (e.g., in hexadecimal form). For example, an input string "my email is john@domain.com" might return "my email is 3bd26b9b99ade3263d536155207e186c@domain.com". In some cases, a <dbg> tag may be used for debugging purposes. For example, the <dbg> tag may lead to a substring value being printed out to a log file (e.g., via a "system_out" or similar command). The example rules 456, 458, 462 of FIG. 4B illustrate an example usage of these actions in the context of an anonymization rule.

In some cases, sets of two or more rules may be grouped together into rule sets, which may be one way of referring to multiple rules with one indication in a schema. Referring to rule 464 of FIG. 4B, for example, the rule set "ruleSetIP" combines the functionality of the "maskIp" rule 452 and the "maskIp6" rule 454, such that a line of a schema may indicate that an IP address field is to be anonymized (e.g., encrypted) whether it is an IPv4 or IPv6 address. Other types or formats for the anonymization rules may be implemented as well, in some cases. Further, other types or formats for combining anonymization rules into rule sets may be implemented in some cases.

Figure 5A:
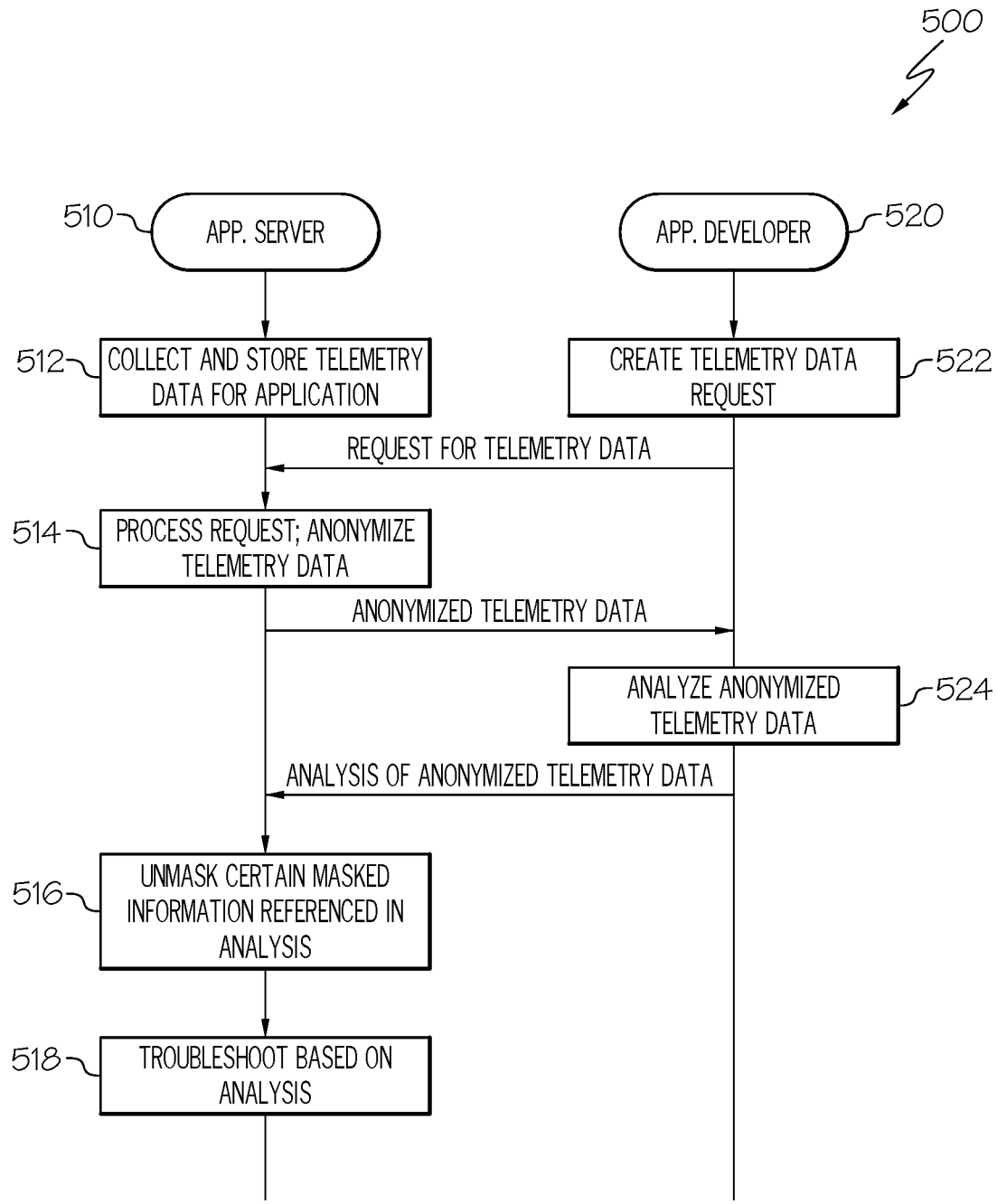
FIGS. 5A-5B are diagrams of an example process for collecting and anonymizing telemetry data for an application in accordance with at least one embodiment.
Figure 5B:
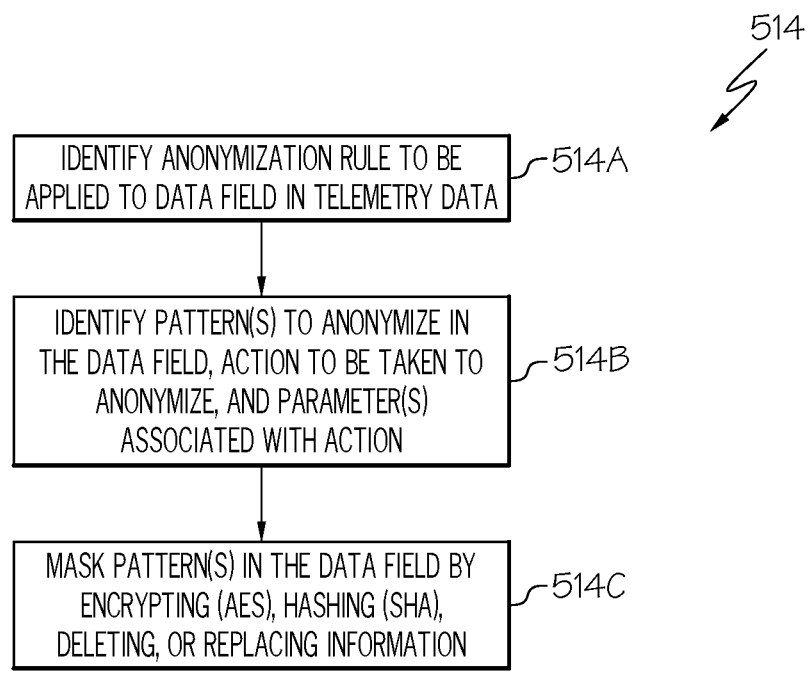

FIGS. 5A-5B are diagrams of an example process 500 for collecting and anonymizing telemetry data for an application in accordance with at least one embodiment. Operations in the example process 500 may be performed by various aspects of a computer system (e.g., the application servers 302 and application developer 320 of FIG. 3). In the example shown, for instance, the process 500 is performed by an application server 510 and an application developer 520. The example process 500 may include additional or different operations, and the operations may be performed in the order shown or in another order. In some cases, one or more of the operations shown in FIG. 5 are implemented as processes that include multiple operations, sub-processes, or other types of routines. In some cases, operations can be combined, performed in another order, performed in parallel, iterated, or otherwise repeated or performed another manner. Further, an entity other than the application server 510 and application developer 520 may perform the operations shown in FIGS. 5A-5B. For example, a virtual machine host or another type of machine that hosts an application may perform the operations 512, 514, 516, 518. As another example, a consultant or other type of third party may perform the operations 522, 524.

At 512, the application server 510 collects and stores telemetry data for an application hosted thereon. In some cases, the collection of the telemetry data may be based on a data collection schema, such as the schema 400 of FIG. 4A. The schema may be stored and managed at the application server 510, or by another entity or machine. The telemetry data may be stored in a database (e.g., database 311 of FIG. 3) after collection at 512, or may be stored in the database at another time (e.g., after anonymization at 514).

At 522, the application developer 520 creates a request for telemetry data from the application server 510, and sends the request to the application server 510. The request may be formatted in any suitable manner. In some cases, the request may be formatted similar to the data collection schema used to initially collect the telemetry data at 512. For example, the request may be based on a schema defined at the application server 510 that was replicated and stored with the application developer 520. In some instances, the request may indicate certain data fields in the telemetry data to anonymize based on one or more anonymization rules.

At 514, the application server 510 processes the request received from the application developer 520 and anonymizes telemetry data based on the request. In some instances, processing the request may indicate identifying certain data fields in the telemetry data to anonymize based on the request. In some cases, the fields to anonymize may be indicated in the request. In other cases, the fields to anonymize may be determined by the application server 510. For instance, the application server 510 may identify that IP address information has been requested and may accordingly determine to anonymize the requested IP address information in the telemetry data (e.g., using the "maskIp" rule 452, the "maskIp6" rule 454, or the "ruleSetIP" rule set 464 of FIG. 4B). The application server 510 may then mask the information in each of the identified data fields (that are to be anonymized) based on the corresponding anonymization rule for the data field. The application server 510 may then generate an anonymized version of the telemetry data that includes masked information for the data fields that were identified as needing to be anonymized, and unmasked information for the other data fields indicated in the request.

Referring to FIG. 5B, in some embodiments, masking the information at 514 may include first identifying the anonymization rule to be applied to a particular data field at 514A. This may be done by identifying an anonymization rule that corresponds to the data field. For example, a data collection schema (e.g., the schema 400 of FIG. 4A) or other information may indicate which anonymization rule to apply to particular data fields in the telemetry data. Next, at 514B, a pattern of text to be anonymized in a particular data field may be identified (e.g., based on a "pattern" field in the corresponding anonymization rule for the data field, as described above), and an action to be taken to anonymize the pattern of text may be identified (e.g., based on an "action" field in the corresponding anonymization rule for the data field, as described above), and generating the masked information for the data field accordingly. In some cases, the action to be taken may include replacing information matching the pattern of text with a fixed string, removing information matching the pattern of text, or replacing information matching the pattern of text with a masked version of the information. In some cases, one or more parameters may be included in the anonymization rule. In such instances, those parameters may be identified at 514B as well (e.g., based on a "params" field in the anonymization rule, as described above).

Finally, at 514C, the information in the data is masked based on the identified pattern, action, and parameters. In some instances, the information in the identified data fields may be masked by encrypting the information in the data field. For example, an encryption function (e.g., an AES encryption function or another type of symmetric key encryption function) may be applied to the information, and the output of the encryption function may be used as the masked information. In other instances, the information in the identified data fields may be masked by hashing the information in the data field. In this case, the masked information would be "reversible" since the application server 510 could later unencrypt the masked information to see the original information for the data field. For example, a hash function (e.g., SHA-256 or another type of hash function) may be applied to the information, and the output of the hash function may be used as the masked information. In this case, the masked information would be "non-reversible" since the application server 510 could not later generate the original information for the data field using the output of the hash function (due to the one-way nature of hash functions).

Once the telemetry data has been anonymized at 514, the application server 510 sends the anonymized telemetry data to the application developer 520, which then analyzes the anonymized telemetry data 524. The analysis may be done for any suitable reason. For example, in some cases, the anonymized telemetry data may be sent to the application developer 520 in order to assist with a support issue for the application owner, and the analysis may attempt to identify a source of the issue. As another example, the analysis may be performed by the application developer 520 along with telemetry data from other application owners to analyze application behavior generally.

In some cases, the application developer 520 may send an analysis or other information to the application server 510 that references certain masked data in the anonymized telemetry data that was sent and analyzed. In these instances, the application server may unmask certain masked information (i.e., the information that is reversible, e.g., encrypted information) referenced in the information sent by the application developer 520. For example, the application server 510 may unencrypt IP address or other information referenced in the information sent by the application developer 520, but may not be able to unmask information that was hashed or removed during the anonymization/masking process. The application server 510 may then use the unmasked information at 518 to troubleshoot an identified issue based on the information provided by the application developer 520. The application server 510 may use the unmasked information for another purpose as well.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    collecting a telemetry data set for an application, the telemetry data set comprising a plurality of data fields associated with application operations;
    processing a request for at least a portion of the telemetry data set;
    identifying data fields in the telemetry data set to be anonymized based on the request, wherein information in the identified data fields is to be anonymized according to corresponding anonymization rules;
    masking the information in each of the identified data fields based on the corresponding anonymization rule for the data field, comprising:
        identifying one or more parameters associated with an action to be taken based on one or more parameter fields indicated in the corresponding anonymization rule for a particular data field; and
        generating the masked information for the particular data field based on the one or more parameters; and
    generating an anonymized telemetry data set, the anonymized telemetry data set comprising the masked information for the identified data fields and unmasked information for other data fields indicated in the request.

2. The method of claim 1, wherein masking the information in each of the identified data fields comprises:
    identifying a pattern of text to be anonymized in a particular data field based on a pattern field indicated in the corresponding anonymization rule for the particular data field;
    identifying an action to be taken to anonymize the pattern of text in the data field based on an action field indicated in the corresponding anonymization rule for the particular data field; and
    generating the masked information for the particular data field based on the pattern of text and the action to be taken.

3. The method of claim 2, wherein the action to be taken comprises one or more of: replacing information matching the pattern of text with a fixed string, removing information matching the pattern of text, and replacing information matching the pattern of text with a masked version of the information.

4. The method of claim 2, wherein the pattern field indicates multiple strings to anonymize in the particular data field, and the parameters include multiple parameters, each parameter corresponding to one of the strings.

5. The method of claim 1, wherein masking the information in each of the identified data fields comprises encrypting information in a data field to produce the masked information.

6. The method of claim 5, wherein the encryption is based on an Advanced Encryption Standard (AES).

7. The method of claim 1, wherein masking the information in each of the identified data fields comprises hashing information in a data field to produce the masked information.

8. The method of claim 7, wherein the hashing is based on a Secure Hash Algorithm (SHA).

9. The method of claim 1, further comprising:
    receiving information about the anonymized telemetry data set, the information referencing particular masked information in the anonymized telemetry data set; and
    unmasking the particular masked information.

10. The method of claim 1, wherein at least one of the anonymization rules is a rule set based on two or more anonymization rules.

11. A non-transitory computer readable medium having program instructions stored therein, wherein the program instructions are executable by a computer system to perform operations comprising:
    accessing a schema for gathering telemetry data collected for an application, the schema indicating a plurality of data fields of the telemetry data to gather, at least one data field in the schema having a corresponding anonymization rule to anonymize information in the data field;
    gathering telemetry data according to the schema, wherein the gathering comprises masking the information for each of the one or more data fields having a corresponding anonymization rule in the schema, the masking based on a masking action indicated in the anonymization rule; and
    generating an anonymized telemetry data set, the anonymized telemetry data set comprising unmasked information for each of the data fields indicated in the schema without a corresponding anonymization rule and the masked information for each of the data fields indicated in the schema having a corresponding anonymization rule.

12. The non-transitory computer readable medium of claim 11, wherein masking the information collected for each of the one or more data fields having a corresponding anonymization rule in the schema comprises:
    identifying a pattern of text to be anonymized in a particular data field based on the corresponding anonymization rule for the particular data field;
    identifying an action to be taken to anonymize the pattern of text in the data field based on the corresponding anonymization rule for the particular data field; and
    generating the masked information for the particular data field based on the pattern of text and the action to be taken.

13. The non-transitory computer readable medium of claim 12, wherein the action to be taken comprises one or more of: replacing information matching the pattern of text with a fixed string, removing information matching the pattern of text, and replacing information matching the pattern of text with a masked version of the information.

14. The non-transitory computer readable medium of claim 13, wherein replacing information matching the pattern of text with a masked version of the information comprises encrypting the information matching the pattern of text.

15. The non-transitory computer readable medium of claim 13, wherein replacing information matching the pattern of text with a masked version of the information comprises hashing the information matching the pattern of text.

16. The non-transitory computer readable medium of claim 12, wherein:
wherein masking the information collected for each of the one or more data fields having a corresponding anonymization rule in the schema further comprises identifying one or more parameters associated with the action to be taken based on the corresponding anonymization rule for the particular data field; and
generating the masked information for the particular data field is further based on the one or more parameters.

17. A system comprising:
a data processing apparatus;
a memory; and
a data masking agent, executable by the data processing apparatus to:
access a schema for gathering telemetry data collected for an application, the schema indicating a plurality of data fields of the telemetry data to gather, at least one data field in the schema having a corresponding anonymization rule to anonymize information in the data field;
gather telemetry data according to the schema, wherein the gathering comprises masking the information for each of the one or more data fields having a corresponding anonymization rule in the schema, the masking based on a masking action indicated in the anonymization rule; and
generate an anonymized telemetry data set, the anonymized telemetry data set comprising unmasked information for each of the data fields indicated in the schema without a corresponding anonymization rule and the masked information for each of the data fields indicated in the schema having a corresponding anonymization rule.

18. The system of claim 17, wherein the data masking agent is executable by the data processing apparatus to mask information by: replacing the information with a fixed string, removing the information, or replacing the information with a masked version of the information.

19. The system of claim 18, wherein the data masking agent is further executable by the data processing apparatus to replace the information with a masked version of the information by: encrypting the information or hashing the information.

* * * * *